Sept. 7, 1937. B. G. DUNHAM Re. 20,496
TELEPHONE SYSTEM
Original Filed May 22, 1934
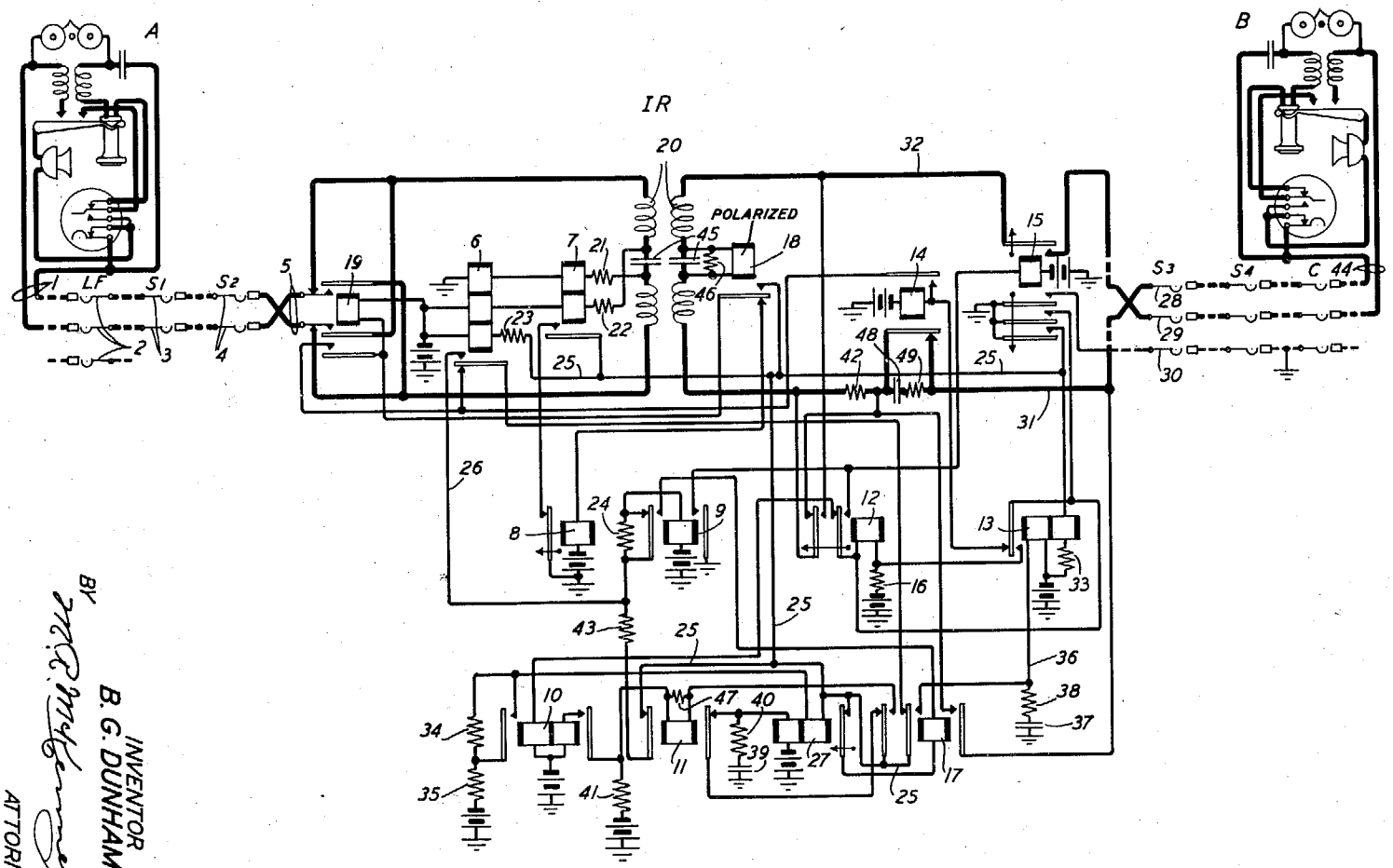
INVENTOR
B. G. DUNHAM
BY M. R. McKenney
ATTORNEY Reissued Sept. 7, 1937

Re. 20,496

UNITED STATES PATENT OFFICE 20,496

TELEPHONE SYSTEM

Bert G. Dunham, deceased, late of Hawthorne, N. J., by Western Electric Company, Incorporated, assignee, New York, N. Y., a corporation of New York Original No. 2,023,011, dated December 3, 1935, Serial No. 726,889, May 22, 1934. Application for reissue December 31, 1936, Serial No. 118,930

17 Claims. (Cl. 179—16)

This invention relates to impulse repeating devices and more particularly to such devices when employed in automatic and semi-automatic telephone systems.

The objects of this invention are to increase the distance over which impulses may be transmitted, to permit a wider range of variation in the speed at which impulses may be sent, to facilitate the release of the equipment, and to otherwise improve systems of this character.

Impulse repeaters have been devised heretofore in which the repeated impulse outgoing from the repeater is started in response to the open portion of the incoming impulse as distinguished from repeaters in which the outgoing impulse awaits the closed period following the open period of the incoming impulse. Arrangements have also been made for correcting the repeated impulses to compensate for variations in the incoming impulses caused both by transmitting devices which send the impulses at a relatively fast rate and by transmitting devices which send impulses at a relatively slow rate. To accomplish such a correction it is necessary, for certain speeds of transmission, to provide an open period for the outgoing impulse which shall not be less than a certain minimum value. This requires that the outgoing circuit, once opened, be held opened under the control of time measuring devices which function independently of the subsequent operation of the impulse relay that responds to the incoming impulses. If, however, the outgoing circuit is reclosed at the end of the measured interval regardless of the condition of the relay receiving the incoming impulse, the repeater is not able to distinguish between an impulse that should be repeated to the outgoing circuit and a release signal which should merely open the outgoing circuit without causing its reclosure.

According to the present invention, advantages are secured over these prior systems by an impulse repeating arrangement in which the outgoing circuit is opened to send the repeated impulse in response to the opening of the incoming circuit, in which a correction is applied to the outgoing impulses for varying speeds of impulse transmission by insuring that the outgoing circuit, once opened, will remain open for an interval of time not less than a predetermined minimum value regardless of whether the incoming circuit has reclosed to terminate the open period of the incoming impulse, and so arranged that if said minimum open interval for the outgoing impulse terminates prior to the reclosure of the incoming circuit the outgoing circuit is held open until such time as the incoming circuit again closes. In this manner the repeater is able to distinguish between an open condition of the incoming circuit caused by the transmission of an impulse, which is followed by a closure of the incoming circuit, and an opening of the incoming circuit because the calling subscriber or operator has initiated a release, in which case the incoming circuit is not reclosed. If the opening is due to an impulse the outgoing circuit should again close following its corresponding open period, whereas if the opening of the incoming circuit is caused by the initiation of a release, the outgoing circuit once opened should be held open and should not be reclosed even momentarily.

Another feature is a correcting arrangement comprising two circuits for controlling the outgoing impulses in which at slow speeds the outgoing line is opened by one of the circuits and closed by the other after a measured interval, and in which at high speeds the latter circuit is held open and the outgoing line is both opened and closed by the first mentioned circuit.

The foregoing and other features of this invention will be explained more fully in detail in the following specification which should be taken in connection with the accompanying drawing.

The drawing represents schematically a dial telephone system having a repeater circuit arranged in accordance with this invention. The station designated A represents a calling station and the station designated B represents a called station. A line-finder LF has access to groups of lines including the line to which station A is connected. Selectors S1, S2, S3 and S4 serve to extend a call to a connector C having access to groups of lines including the line to which station B is connected. An incoming repeater circuit IR is shown in detail.

The subscribers' stations A and B are provided with the usual subscriber's set with a dial for controlling the establishment of desired connections. The line-finder switch LF is of the well-known Strowger type and may be similar to that disclosed in Patent 1,711,682 issued May 7, 1929 to H. Hovland, the brushes 2 corresponding to one of the two sets of brushes shown in the Hovland patent. The selector switches S1, S2, S3 and S4 and the connector switch C are also of the well-known Strowger type, and reference may be had to pages 53 to 67 inclusive of the 2nd edition of "Automatic Telephony" by Smith and Campbell for a detailed description of the operation of the circuits associated with these switches. Only those portions of the circuits of the line-finder, selector and connector switches are shown as is required for a clear and complete description of this invention, the omitted portions of these circuits being represented by broken lines.

The incoming repeater IR is shown in detail and is associated with the interoffice trunk 5 to repeat the impulses for establishing the remainder of the connection after the calling line has been extended to this repeater circuit. The operation of this circuit is fully set forth in the following description of a call from station A to station B.

When the receiver is removed from the receiver hook at station A to originate a call, the line-finder LF hunts for and extends the line 1 through its multiple brushes 2 to the first selector S1. When the calling subscriber dials the first digit of the called subscriber's number, the brushes 3 of selector S1 are advanced to a corresponding group of terminals. The selector S1 then automatically hunts for and seizes an idle set of terminals in the selected group to extend the line 1 to the second selector S2. When the calling subscriber dials the second digit of the called subscriber's number, the brushes 4 of selector S2 are advanced to a corresponding group of terminals. The selector S2 then automatically hunts for and seizes an idle set of terminals in the selected group.

Assume that the selected set of terminals is connected to the incoming trunk 5 which is associated with the incoming repeater IR. A circuit is thereby closed to operate relays 6 and 7 from ground, through upper windings of relays 6 and 7, resistance 21, lower left winding of repeating coil 20, lower back contact of relay 19, tip conductor of trunk 5, tip terminals and brushes of selectors S2 and S1, tip terminal and brush of line-finder LF, tip conductor of line 1, through the subscriber's instrument at station A, ring conductor of line 1, brush and ring terminal of line-finder LF, brushes and ring terminals of selectors S1 and S2, ring conductor of trunk 5, upper back contact of relay 19, upper left winding of repeating coil 20, resistance 22, lower winding of relay 7 and thence through the middle winding of relay 6 to battery. Relay 6 (and this is also true of relays 13 and 27 later to be mentioned) is of the type wherein a permanent magnet is employed and wherein an electrical means of biasing is used for restoring the armature to normal rather than the usual mechanical means. Relay 7 closes a circuit through both windings of the electrically biased relay 27. This circuit may be traced from ground at back contact of relay 8, front contact of relay 7, conductor 25, thence in parallel, one path extending through right winding of relay 27, resistance 34 and thence through resistance 35 to battery, and the other extending through left outer back contact of relay 17, right back contact of relay 11 and through the left winding of relay 27 to battery. The current through the left winding of relay 27 electromagnetically opposes the current through its right winding so that the resulting bias will restore this relay to normal, if operated. The operation of relay 7 also causes the operation of relay 13 in a circuit from ground at the back contact of relay 8, front contact of relay 7, conductor 25, right winding of relay 13, and through resistor 33 to battery. Relay 7 also closes an obvious circuit through resistance 23 and the lower winding of relay 6 to battery for the purpose of effecting an electrical bias on relay 6 thereby insuring its release when its operating circuit is opened.

Relays 6 and 7 operated close a circuit for energizing relay 9. This circuit may be traced from ground at the back contact of relay 8, front contact of relay 7, conductor 25, left inner back contact of relay 17, front contact of relay 6, conductor 26, and thence through the back contact and winding of relay 9 to battery. The operation of relay 9 closes an obvious circuit for the energization of slow-to-release relay 15, removes the short circuit from resistance 24 and connects the winding of relay 17 to conductor 26 in a circuit traced from conductor 26, left front contact of relay 9, winding of relay 17, back contact of relay 27 and thence to ground on conductor 25 as aforementioned. Relay 15 is slow-to-release and is so designed that it will not release when its circuit is momentarily opened during the transmission of outgoing impulses. Resistance 24 is provided for the purpose of reducing the voltage across relay 9 after its back contact is opened. This resistance is normally short-circuited in order that the full voltage of the central office battery may be impressed across the winding of relay 9 to accelerate its operation. Relay 17 does not operate in the aforementioned circuit since its winding is short-circuited by ground on conductor 26. The operation of slow-to-release relay 15 connects ground to conductor 25 thereby supplementing the aforementioned ground on this conductor, connects ground to the sleeve brush 30 of selector S3, closes an energizing circuit for relay 10 and closes a bridge to the line relay (not shown) of selector S3. This latter circuit may be traced from brush 28 of selector S3, tip conductor 31, back contact of relay 14, back contact of relay 12, lower right winding of repeating coil 20, through resistance 46 and relay 18 in parallel, upper right winding of repeating coil 20, ring conductor 32, upper front contact of relay 15 and thence to brush 29 of selector S3. The polarized relay 18 does not operate at this time since the current through its winding is flowing in the wrong direction. Relay 10 is energized in a circuit from ground at lower middle front contact of relay 15, left inner back contact of relay 12 and through left winding of relay 10 to battery. Relay 12 does not operate since its winding is short-circuited by the front contact of relay 13. Relay 10 operated short-circuits resistance 34 for the purpose of altering the operating time of relay 27 for the first digit dialed into the repeater as will be explained later.

When the impulses corresponding to the third digit of the called number are dialed, relay 6 is alternately released and reoperated. Relay 7 may or may not release during the transmission of impulses. Its function is immaterial following the operation of relay 15 since the latter relay now furnishes a ground on conductor 25 for holding the repeater. Each release of relay 6 opens the aforementioned short circuit from relay 17 thereby causing its operation in a circuit from ground on conductor 25, right back contact of relay 27, through winding of relay 17, front contact of relay 9, resistance 24 and through the winding of relay 9 to battery. Relay 9 also remains operated in this circuit. Relay 17 operated removes ground from the armature of relay 6 and closes a circuit through the left winding of relay 13. This circuit may be traced from ground on conductor 25, left inner front contact of relay 17, conductor 36 and through the left winding of relay 13 to battery. The current through the left winding of relay 13 electromagnetically opposes the current through its right winding thereby causing the release of relay 13. The aforementioned ground on conductor 36 also provides a discharging path for condenser 37 through resistance 38. Relay 17 opens the aforementioned circuit for the left winding of relay 27 thereby causing the operation of relay 27 after a predetermined time interval. When the circuit, through the left winding of relay 27, is opened, the condenser 39 will start to charge in an obvious circuit. This charging current will maintain relay 27 released until said charging current has decreased to a value such that the difference between the resulting magnetic forces in the left winding and the magnetic forces in the right winding is sufficient to cause the operation of said relay. The windings of relay 27 are so designed and the constants of the resistances 34, 35 and 40 and condenser 39 are so chosen that a predetermined operating time for relay 27 is obtained. Relay 17 operates relay 11 in a circuit from ground on conductor 25, left outer front contact of relay 17, winding of relay 11 and resistance 47 in parallel, thence in parallel, one path extending through resistance 41 to battery; and the other extending through right front contact and winding of relay 10 to battery. Relay 10 is held operated by its right winding under control of relay 17. Relay 17 also closes a circuit in parallel with the lower back contacts of relay 14.

The release of relay 13 causes the operation of relay 12 in a circuit which may be traced from ground a lower middle front contact of relay 15, winding of relay 12 and through resistance 16 to battery. Relay 12 is slow-to-release and is designed to remain operated during the transmission of impulses. Relay 13 released also causes the operation of relay 14 in a circuit from ground at lower middle front contact of relay 15, back contact of relay 13 and through winding of relay 14 to battery. Relay 12 maintains a holding circuit for relay 15 from ground at lower middle front contact of relay 15, left inner front contact of relay 12 and through the winding of relay 15 to battery, removes the short circuit from resistance 42 and short-circuits the right windings of repeating coil 20 during the transmission of each series of impulses to prevent interference with impulse transmission. Resistance 42 is thus included in the pulsing circuit and is required in some cases for compensating the pulsing loop. The operation of relay 11 removes the shunt consisting of resistance 43 from the winding of relay 17.

When relay 27 operated, it opened the aforementioned circuit for relays 9 and 17 thereby causing the release of said relays. The release of relay 9 short-circuits resistance 24 to accelerate the reoperation of relay 9 as aforementioned when its circuit is reclosed. Relay 17 released, reconnects ground through its left inner back contact to the armature of relay 6, opens the left winding (release) of relay 13 thereby causing the reoperation of relay 13 after a predetermined time interval. When the circuit through the left winding of relay 13 is opened, condenser 37 will start to charge in an obvious circuit. This charging current will maintain relay 13 released until said charging current has decreased to a value such that the difference between the resulting magnetic forces in the left winding and the magnetic forces in the right is sufficient to cause the operation of said relay. As aforementioned, for relay 27, the windings of relay 13 are so designed and the constants of resistances 33 and 38 and condenser 37 are so chosen that a predetermined operating time is obtained for relay 13. Relay 17 released, opens the operating circuit for relay 11 and the holding circuit for relay 10, thereby causing the release of said relays and also opens the aforementioned bridge across conductors 31 and 32 thereby repeating the first impulse of the series to line relay (not shown) of selector S3. This circuit, as initially traced, was completed through the back contacts of relay 14 and subsequently through the right front contacts of relay 17 which parallel the back contacts of relay 14. The aforementioned operation of relay 14 opened the initial operating path for the line relay (not shown) of selector S3 and thereby transferred the control of the outgoing pulsing or dialing circuit to relay 17. The release of relay 17 then initiates the open period of the first repeated pulse to operate selector S3. Condenser 48 and resistance 49, shown bridged across the back contacts of relay 14 and the right front contacts of relay 17, are provided to improve pulsing.

The release of relay 11 discharges condenser 39 in a circuit traced from ground at condenser 39, resistance 40, right back contact of relay 11 and thence to aforementioned ground on conductor 25. Relay 11 released recloses the circuit through the left winding of relay 27, thereby causing the release of this relay as aforementioned and partially energizes relay 9 in a circuit traced from ground on conductor 25, left back contact of relay 11, resistance 43 and thence through the back contact and winding or relay 9 to battery. The current through the winding of relay 9 is not sufficient to cause its operation. However, its partial energization at this time is intended to facilitate its operation when its circuit is reclosed at the front contact of relay 6. The release of relay 10 removes the short circuit from resistance 34. Since the initial operating circuit for relay 10 is opened at the left inner back contact of relay 12 and since relay 12 is held operated during the pulsing period, as will be described presently, relay 10 can not reoperate and therefore the right winding of relay 10 is not included in the subsequent operating circuit for relay 11.

Thus, resistance 34 is short-circuited only for a period prior to the open period of the first incoming pulse. Relay 10 and resistance 34 are provided to compensate for the difference in time between the release of relay 6, following its initial operation, and the release of said relay following subsequent operations, the releasing time for relay 6 being greater for the first mentioned condition than for the second condition. This compensation is accomplished by changing the constants of relay 27 in a manner so that the initial operation of relay 27 will be accelerated as compared to subsequent operations.

Relay 27 is so designed and electrically biased that its operating time plus the releasing time of relay 17 will insure a closure of the bridge across conductors 31 and 32 for a time interval equal to the minimum required for satisfactory stepping of the succeeding selector and connector switches when the impulse frequency is high. Relay 13 is designed and electrically biased so that its operating time plus the releasing time of relay 14 will insure an opening of the bridge across conductors 31 and 32 for a time interval equal to the minimum required for satisfactory stepping of the succeeding selector and connector switches when the impulse frequency is low. When impulses are being received by relay 6 at a low rate of impulses per second, the open periods constitute such a small part of each impulse cycle that it is necessary to provide a fixed minimum allowable open period for each impulse in order that the line relay (not shown) of the switch to which the impulses are being transmitted will not be in an operated position long enough to cause a failure of the switch. The minimum allowable open period of each impulse is determined by the operating time of relay 13 and the releasing time of relay 14. This timing is accomplished as follows: When relay 6 reoperates, following the first impulse, relay 9 reoperates, but before relay 6 releases on the succeeding impulse relay 13 has had sufficient time to operate thereby releasing relay 14. Relay 14 released recloses the bridge thus terminating the open period of the previous outgoing impulse independently of relay 17. If the open period of the incoming impulse has not ended and relay 6 reoperated by the time relay 13 operates, relay 14 is held operated through its front contact, back contact of relay 6, and left inner back contact of relay 17 to ground on conductor 25. The open period of the outgoing impulse is thus continued until relay 6 reoperates at the end of the open period of the incoming impulse. At higher impulse frequencies each impulse cycle is shorter and, if the frequency exceeds a certain value, the open periods (as measured by relays 13 and 14) constitute such a large part of each impulse cycle that it is necessary to control the bridge closure independently of relays 13 and 14 in order that the line relay (not shown) of the switch to which the impulses are being transmitted will not be in a non-operated position long enough to cause a failure of the switch. The frequency at which the closed period is barely sufficient to prevent a failure of the switch receiving the impulses when the open period is controlled by relays 13 and 14 is a critical frequency. At frequencies higher than the critical frequency the minimum allowable closed period of each impulse is determined by the operating time of relay 27 and the releasing time of relay 17. This timing is accomplished as follows: When relay 6 reoperates following the first impulse, relay 9 reoperates and when relay 6 releases on the succeeding impulse, relay 17 operates to reclose the releasing circuit for relay 13 before this relay has had time to operate. Relay 14 therefore remains operated during the transmission of impulses and relay 17 recloses the bridge to terminate the open period of the previous impulse independently of relay 14. Thus it is seen that when the impulse frequency is low, the open period of the outgoing pulse is timed and that when the impulse frequency is higher than the critical frequency, the closed period of the outgoing pulse is timed thereby correcting the outgoing pulses for satisfactorily controlling the stepping of the succeeding selector and connector switches.

On the last impulse of each digit dialed, relay 13 operates thereby releasing relay 12. Relay 12 removes the holding ground for relay 15 which will now be held operated under control of relay 9, reoperates relay 10, removes the short circuit from the right windings of repeating coil 20 and short-circuits resistance 42.

The alternate closing and opening of the bridge across conductors 31 and 32 as aforementioned, causes the associated selector S3 to function in the usual manner to select an idle trunk terminating in selector S4. When the calling subscriber dials the remaining digits of the called station's number, the selector S4 and the connector are operated to extend the connection to line 44 with which station B is associated. When the called subscriber removes the receiver at station B in answer to the usual ringing signal, the connector C operates in the usual manner to reverse the current flowing through the polarized relay 18 in the incoming repeater IR. Relay 18 operates when the current is reversed thereby causing the operation of the reversing relay 19 in a circuit traced from ground at lower outer front contact of relay 15, front contact of relay 18 and through the winding of relay 19 to battery. Relay 19 reverses the connections from the conductors of trunk 5 with respect to the windings of relay 6 so that the current is reversed over the conductors of trunk 5 to signal the operator or to initiate the operation of the charging meter (not shown) associated with the calling subscriber's line 1. The talking circuit extends through the repeating coil 20 and the talking condensers 45.

When the connection is released by the calling subscriber, relay 6 releases thereby causing the operation of relay 17 in series with relay 9. Relay 17 releases relay 13, removes ground from the armature of relay 6, opens the release circuit of relay 27 thereby causing said relay to operate after an interval of time, operates relay 11 and closes a circuit in parallel with the back contacts of relay 14. Relay 13 released, causes the operation of relays 12 and 14. Relay 14 closes a circuit for holding relay 19 operated from ground at lower middle contact of relay 15, back contact of relay 13, front contact of relay 14 and through lower outer front contact and winding of relay 19 to battery. The operation of relay 12 holds relay 15 operated and short-circuits the right windings of repeating coil and winding of relay 18 thereby causing the release of said relay. Relay 18 released, operates relay 8 in a circuit traced from aforementioned ground at lower front contact of relay 19, back contact of relay 18 and through winding of relay 8 to battery. When relay 27 operates, it releases relays 9 and 17. Relay 17 released, opens the bridge across conductors 31 and 32, reconnects ground to the armature of relay 6, causes relay 13 to operate after a time interval and releases relays 10 and 11. Relay 11 released, releases relay 27. Relay 13 reoperated, releases relay 12 and opens the operating circuit for relay 14 and the holding circuit for relay 19. However, these relays are held operated under control of relay 15 from ground on conductor 25, left inner back contact of relay 17, back contact of relay 6, thence in parallel, one path extending through the lower outer front contact and winding of relay 19 to battery, and the other extending through the front contact and winding of relay 14 to battery. The release of relay 12 releases slow-to-release relay 15 which removes ground from the sleeve conductor of selector S3 and releases all other operated relays. In this manner the repeater is able to distinguish between an open condition of the incoming circuit caused by the transmission of an impulse which is followed by a closure of the incoming circuit and an opening of the incoming circuit caused by the release of the calling subscriber or operator, in which case the incoming circuit is not reclosed. Relay 8 is slow-to-release and disconnects ground from the armature of relay 7 for a sufficient length of time to prevent the momentary reoperation of relays 6 and 7 from simulating a reseizure of the repeater by selector S2. This momentary operation of relays 6 and 7 is caused by a momentary short circuit across the tip and ring conductors, associated with the left windings of repeating coil 20 when relay 19 releases. The release of relay 8 restores the circuit to normal ready for seizure on another call.

The features of this invention are not limited in their application to an incoming repeater circuit but may also be incorporated in outgoing repeaters as well.

What is claimed is:

1. The combination in a repeating mechanism of an incoming circuit and an outgoing circuit, means for opening and closing the incoming circuit to send an impulse to said mechanism, means responsive to the opening of the incoming circuit for causing the opening of said outgoing circuit, time measuring means for maintaining said outgoing circuit open not less than a predetermined interval of time, and means dependent on the condition of the incoming circuit for holding open said outgoing circuit beyond the termination of said predetermined interval.

2. The combination in a repeater of an incoming line and an outgoing line, impulse transmitting means for opening and closing said incoming line, means responsive to the opening of the incoming line for causing the opening of said outgoing line to transmit an impulse thereover, timing means for holding open said outgoing line for a period of time not less than a predetermined interval, and means for preventing the reclosure of said outgoing line until said incoming line has reclosed.

3. The combination in a repeating mechanism of an incoming circuit and an outgoing circuit, means for opening and closing the incoming circuit to send impulses therein, means responsive to the opening of the incoming circuit for causing the opening of said outgoing circuit at a given point, means for closing said outgoing circuit at another point, timing means for insuring that the time between the opening and closing of said outgoing circuit shall not be less than a predetermined interval, and means effective if the incoming circuit has not reclosed at the end of said predetermined interval for maintaining said outgoing circuit open.

4. The combination in a repeater of an incoming line, an impulse receiving relay for said incoming line, means for opening and closing the incoming line to operate said impulse receiving relay, a second relay responsive to the impulse receiving relay when the incoming line is opened for opening said outgoing line, timing means for reclosing said outgoing line at the end of a predetermined interval after the opening thereof by said second relay, and means controlled by said impulse receiving relay if said incoming line is not reclosed prior to the expiration of said predetermined interval for maintaining said outgoing line open until the closure of said incoming line.

5. The combination in a repeating mechanism of an incoming circuit and an outgoing circuit, means for opening and closing the incoming circuit to transmit impulses, two control contacts for said outgoing circuit, means responsive to an incoming impulse for opening one of said contacts to open the outgoing circuit, means for closing the other of said contacts to reclose said outgoing circuit, and means effective in response to a change in the speed of said incoming impulses for holding said second contact open and for rendering said first contact effective both to open and close said outgoing circuit.

6. The combination in an impulse repeater of an incoming line, means for opening and closing said incoming line at varying rates of speed to send impulses thereover, an outgoing line, two separate circuits for closing said outgoing line, means responsive to an incoming impulse for opening one of said circuits to open said outgoing line, means effective if the incoming impulses are transmitted at a given rate of speed for closing the other of said circuits to close the outgoing line, and means effective if the incoming impulses are transmitted at a different rate of speed for holding said second circuit open and for rendering said first circuit effective both to open and to close said outgoing line.

7. The combination in an impulse repeating mechanism of an incoming line and an outgoing line, means for opening and closing said incoming line at different rates of speed to transmit impulses thereover, two separate control circuits for opening and closing said outgoing line, means effective when impulses are transmitted at a fast rate for holding one of said circuits open and for opening and closing the other of said circuits to repeat impulses over the outgoing line, and means effective when impulses are transmitted at a slow rate for closing the outgoing line over said first circuit following the opening of said outgoing line by said second circuit.

8. The combination in an impulse repeating mechanism of an incoming line and an outgoing line, means for opening and closing the incoming line at different rates of speed to send impulses thereover, two parallel circuits for controlling said outgoing line, means responsive to the opening of the incoming line for opening one of said circuits to effect the opening of said outgoing line, timing means effective at the end of a predetermined interval following the opening of said outgoing line for closing the other of said circuits to effect the closure of said outgoing line, and means effective to hold said other bridge circuit open to prevent the reclosure of said outgoing line provided the incoming line has not reclosed at the expiration of said predetermined interval.

9. The combination with a repeating mechanism of an incoming circuit and an outgoing circuit, means for opening and closing the incoming circuit to send an impulse to said mechanism, means responsive to the opening of said incoming circuit for measuring a predetermined interval of time and then opening the outgoing circuit, and means for measuring a predetermined period of time and then closing said outgoing circuit.

10. The combination with a repeater of an incoming circuit, transmitting means for opening and closing said incoming circuit to send impulses thereover to said repeater, means responsive to the opening of the incoming circuit for measuring a predetermined interval regardless of the rate at which impulses are sent by said transmitter and then opening said outgoing circuit, and means for measuring a predetermined period of time if said impulses are sent at a particular rate, and then closing said outgoing circuit.

11. In an impulse correcting repeater arranged to respond to each impulse of a series by transmitting a corrected impulse responsive to the receipt of each incoming impulse of the series, means effective when the incoming impulses are being received at a given frequency for retransmitting corrected impulses of a given length, and means quiescent at said given frequency, but actively effective when the impulses are incoming at a lower frequency for exercising a maximum-limit control over the length of the corrected outgoing impulses.

12. In an impulse correcting repeater arranged to receive a series of incoming impulses and to transmit a corrected outgoing impulse for each incoming impulse received, means in the impulse corrector for delaying the starting of an outgoing impulse until the lapse of a predetermined time following the receipt of the corresponding incoming impulse, and means for terminating the outgoing impulse responsive to the beginning of the next following incoming impulse.

13. In an impulse correcting repeater arranged to receive a series of incoming impulses and to transmit a corrected outgoing impulse for each incoming impulse received, means in the impulse corrector for delaying the starting of an outgoing impulse until the lapse of a predetermined time following the receipt of the corresponding incoming impulse, means for terminating the transmission of a corrected outgoing impulse responsive to the beginning of the next following incoming impulse, and additional means for terminating the final outgoing corrected impulse of a series.

14. In an impulse corrector arranged to receive a series of incoming impulses and to transmit a corrected outgoing impulse for each received incoming impulse, means for starting each corrected impulse a predetermined time following the beginning of the corresponding incoming impulse, and means for terminating each corrected outgoing impulse responsive to the lapse of a predetermined time interval or to the beginning of the next incoming impulse, whichever occurs first.

15. In an impulse corrector arranged to respond to a series of incoming impulses to transmit a corrected outgoing impulse for each incoming impulse received, means for regulating the length of each corrected outgoing impulse to a fixed standard which is independent of variation in the length of an incoming impulse within fixed limits, and means for preventing the termination of an outgoing impulse prior to the termination of the corresponding incoming impulse, whereby, when the incoming impulse is of such a length as to greatly exceed the length of the incoming impulses normally received, the length of the outgoing repeated impulse is accordingly increased.

16. In an impulse corrector arranged to respond to a series of incoming impulses by repeating a corrected outgoing impulse for each incoming impulse received, means for regulating the length of each corrected outgoing impulse so that it is independent of the length of the corresponding incoming impulse, within fixed limits, and means effective when an incoming impulse exceeds the fixed limits and is of indefinite length for causing the corresponding outgoing impulse to be transmitted as an impulse of a corresponding indefinite length.

17. In an impulse corrector arranged to respond to a series of incoming impulses by repeating a corrected outgoing impulse for each incoming impulse received, means for starting each repeated impulse responsive to the starting of the original incoming impulse independent of the termination of such original impulse, and means for making the termination of the repeated impulse dependent upon the original impulse having terminated, whereby the repeated impulse may be of indefinite duration when the original impulse is of indefinite duration.

WESTERN ELECTRIC COMPANY,
INCORPORATED.
*Assignee of Bert G. Dunham, Deceased,*
By C. G. STOLL,
*Vice President.*